Feb. 25, 1969 R. L. DALTON 3,430,196
TIRE PRESSURE INDICATOR
Filed June 16, 1966
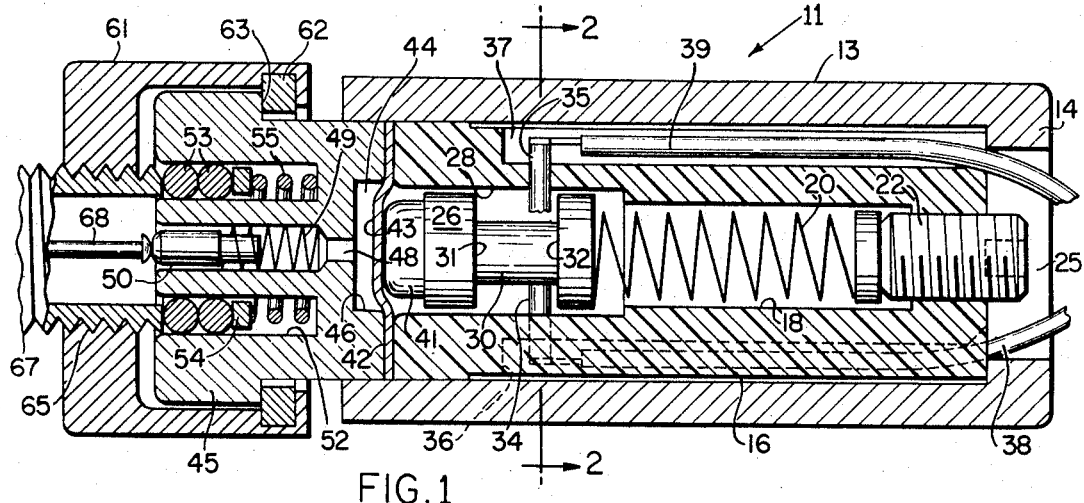
FIG. 1
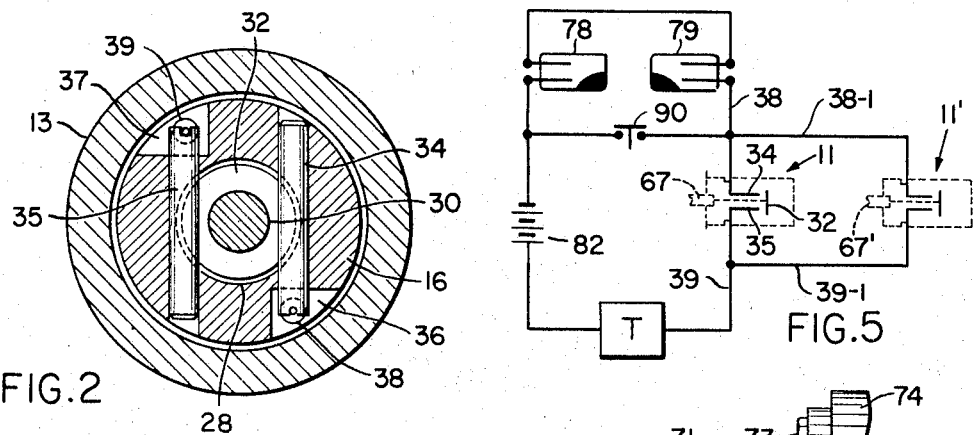
FIG. 2
FIG. 5
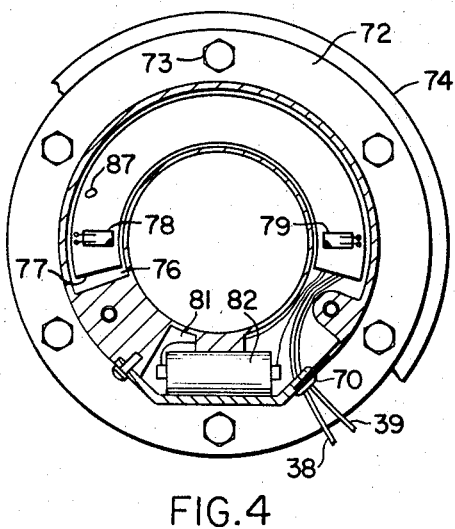
FIG. 4
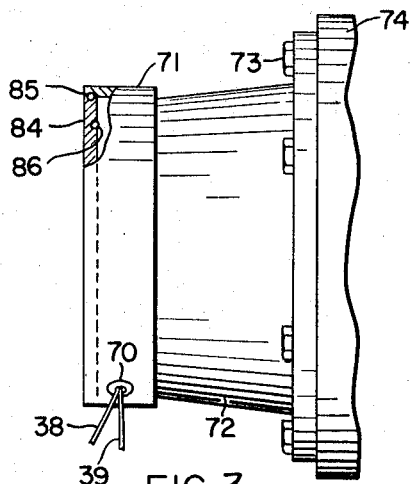
FIG. 3
INVENTOR.
ROBERT L. DALTON
BY
ATTORNEY

United States Patent Office 3,430,196
Patented Feb. 25, 1969

3,430,196
TIRE PRESSURE INDICATOR
Robert L. Dalton, Pittsford, N.Y., assignor to R. D. Products Incorporated, East Rochester, N.Y., a corporation of New York
Filed June 16, 1966, Ser. No. 558,085
U.S. Cl. 340—58     12 Claims
Int. Cl. B60c 23/00, 23/02

This invention relates to a device for detecting leaks in pneumatic tires, and more particularly to a pressure-responsive indicator for warning a truck driver of the existence of an undesirable low pressure condition in one of the dual tires of his truck.

On trucks, tractors and trailers, that have axles equipped with dual tires, it is extremely difficult to judge visually whether or not the tires are inflated to the proper pressure. However, if one of a pair of dual tires should begin to leak and lose pressure, the other tire of the pair will have to assume the load normally supported by the two together. If this continues for any length of time irreparable damage may be done to the other tire.

Various warning devices have been developed for use on dual-tired vehicles to advise the driver of a low pressure in a tire. Heretofore indicators of the type described, however, have been constructed to emit a signal whenever the air pressure in an associated tire drops below a predetermined amount, regardless of whether the vehicle is motionless (parked) or in motion. The disadvantage of this construction is that, if the driver leaves the vehicle unattended for an extended period of time, and during this time one of the tires becomes dangerously soft or flat, the battery which powers the associated transmitter may run down before the driver returns. Hearing or seeing no warning signal, the driver may then drive away unaware of the dangerous condition existing in one of the tires.

An object of this invention is to provide an improved warning device of the type described, which normally will not operate when the associated vehicle is stationary.

Another object of this invention is to provide an improved tire pressure indicator, which is operable only during the rotation of the associated tire.

A further object of this invention is to provide an improved indicator of the type described, which is substantially more compact and less expensive to manufacture than prior, like indicators.

Other objects of the invention will be apparent hereinafter from the specification and from the recital of the appended claims, particularly when read in conjunction with the accompanying drawing.

In the drawing:

FIG. 1 is a longitudinal sectional view showing the novel pressure-switch of a pressure warning device made in accordance with one embodiment of this invention mounted on the valve stem of a tire whose pressure is to be monitored;

FIG. 2 is a sectional view taken along the line 2—2 in FIG. 1 looking in the direction of the arrows;

FIG. 3 is a fragmentary side view on a reduced scale of a hollow housing which is secured to a hub cap of the vehicle and in which portions of this warning device are housed;

FIG. 4 is an end view of this housing with its cover removed; and

FIG. 5 is a wiring diagram illustrating one manner in which the device may be wired to function as a warning device.

Referring now to the drawing by numerals of reference, 11 designates a novel pressure-responsive switch, which forms part of a tire pressure indicator or warning device made in accordance with one embodiment of this invention. This switch 11 comprises a hollow cylindrical housing 13, which has at its upper end an integral, radially inwardly projecting flange 14. Press fit or otherwise secured in the housing 13 coaxially thereof is a plastic, dielectric hollow, generally-cylindrical switch body 16. The body 16 seats at its upper end against the flange 14 and at its lower end is axially spaced upwardly from the lower end of the housing.

Mounted in an axial bore 18 in the switch body 16 is a compression spring 20, the upper end of which seats against the head of an axially adjustable stop screw 22, that is threaded into the upper end of body 16 to be adjustable through a central opening 25 in flange 14. At its lower end spring 20 engages one end of an axially slidable switch contact 26, which is mounted to reciprocate in a counterbore 28 formed in the lower end of body 16. Intermediate its ends contact 26 has a reduced diameter portion 30, and a pair of axially spaced, circumferential shoulder 31 and 32, which confront one another at opposite ends, respectively, of the reduced diameter portion 30.

Shoulder 32 is urged by spring 20 against a pair of pins 34 and 35, which are secured in body 16 to extend transversely into counterbore 28 at diametrally opposite sides thereof. At their outer ends pins 34 and 35 project into axially extending grooves 36 and 37, respectively, formed in diametrally opposite sides of body 16. Housed in grooves 36 and 37, respectively, are insulated wire connectors 38 and 39, respectively. At their lower ends wires 38 and 39 are soldered to the outer ends of pins 34 and 35, respectively. At their upper ends wires 38 and 39 extend out of opening 25 in flange 14 to be connected to a warning circuit as described below.

At its lower end, the sliding contact 26 has a rounded head 41, which seats against a flexible, generally disc-shaped diaphragm 42 that is secured in the housing 13 over the lower end of the switch body 16. The diaphragm 42 has a diameter slightly less than the interior diameter of housing 13; and in its center it has a downwardly projecting depression 43.

Press fit or otherwise secured in the lower end of sleeve 13 coaxially thereof is a generally cylindrical plug 45. At its upper end plug 45 is centrally recessed, as denoted at 44, and around this recess is formed with an annular boss 46, which engages the diaphragm 42 around the outside of its depression 43 to secure the diaphragm against the lower end of switch body 16.

The plug 45 has an axial bore 48, which registers at its upper end with the depression 43 in diaphragm 42, and is counterbored to accommodate a compression spring 49 and a plunger 50. In its lower end plug 45 also has an annular recess 52, which surrounds its central bore 48 coaxially thereof.

Housed in recess 52 is a coil spring 55 which bears at its upper end against the upper wall of the recess and at its lower end against a washer 54. Mounted side by side in the lower end of recess 52 are two resilient O-rings 53. Washer 54 is pressed against these O-rings by spring 55, which resists the movement of the rings 53 axially upwardly of the recess 52.

Rotatably mounted on the lower end of plug 45 is a generally cup-shaped nut 61. A retaining ring 62, which surrounds the head 45 and engages against an external shoulder 63 on the plug, serves to limit axial movement downwardly of the nut 61 relative to the plug. In use, the nut 61 is adapted to be threaded as at 65 onto the conventional valve stem 67 of a tire until the plunger or valve 68 in the stem is opened by plunger 50. At this time the stem 67 will enter the recess 52 in the plug and be sealingly engaged by the spring loaded O-rings 53. Thus, the compressed air in the tire will pass through the bore 48 in plug 45, and act against the flexible diaphragm 43.

Assuming that the air pressure in the truck tire is satisfactory (for example, 100 pounds per square inch), the compressed air acting against diaphragm 43 will force contact 30 upwardly against the resistance of spring 20 to cause shoulder 32 to disengage pins 34 and 35. The normally closed switch 11 is thus opened and will remain in open position until the pressure in the associated tire drops below a predetermined value (for example 90 pounds per square inch). At such time the air pressure on the lower side of diaphragm 43 will not be sufficient to overcome the force of the compression spring 20, so that contact 26 will be shifted to the left from the position illustrated in FIG. 1, until the shoulder 32 again engages the pins 34 and 35, thereby again closing the circuit between wire leads 38 and 39 in the switch housing 13.

From housing 13, the wires 38 and 39 extend through an opening 70 (FIG. 3) into a housing 71, which is secured to the outer end of the conventional hub cap 72 of the axle, on which the wheel that carries the tire, is mounted. At its inner end hub cap 72 is secured in conventional manner by bolts 73 to one end of the housing of a truck axle 74 of the type which carries dual tire and wheel assemblies (not illustrated).

Removably secured in an arcuate recess 76 (FIG. 4) in the housing 71 is a printed circuit board 77, which carries a pair of spaced, conventional, normally open mercury switches 78 and 79, that are located on diametrally opposite sides, respectively, of the housing 71. Secured in a further recess 81 in the housing 71 is a battery 82, providing, for example, a six volt DC power supply for the circuit contained on board 77. At its outer end housing 71 is closed by a removable cover 84, which carries in its periphery a resilient O-ring 85. Ring 85 seats removably and resiliently in a registering annular recess formed on the interior of housing 71 adjacent its outer end. Secured in a circular recess in the inner face of cover 84 is a circular wire antenna 86, which engages a contact 87 on the board 77, when the cover 84 is secured in housing 71.

Within the housing 71 the wires 38 and 39 are connected, as illustrated in FIG. 5, to place the switch 11 in series circuit with the mercury switches 78 and 79, and with a conventional transmitter T. This transmitter is built into the printed circuit board 77 to be powered by the battery 82, and to be connected by the contact 87 to the antenna 86 when the cover 84 is properly mounted in housing 71.

Connected in series with the switch 11, and in parallel with the mecury switches 78 and 79 is a manually operable checking switch 90, which may be closed to by-pass the switches 78 and 79. Connected by wires 38–1 and 39–1 in parallel with the switch 11, is a further pressure-operated switch 11', which is connected to the valve stem 67' of the other tire of the dual tire pair. This other tire of the pair carries a switch assembly exactly like that described above.

The mercury switches 78 and 79 are constructed to be closed and opened by gravity. That is, when either switch is in a position wherein its terminals are at the bottom, the mercury will flow down and bridge the terminals, closing the circuit between them; whereas when either switch is in a position wherein its terminals are at the top, these terminals will be spaced above the mercury in the switch, and the switch will be open. When the vehicle associated with the axle 74 is motionless, or parked, then, one or the other, or both, of the mercury switches 78 or 79 is always open, so that power from the battery 82 cannot be applied to the transmitter T, even though one or both of the two switches 11 and 11' may at the time be closed because of inadequate air pressure in the associated tire or tires. As soon as the vehicle begins to move, however, and reaches a speed of approximately five miles per hour, the centrifugal force exerted on the mercury in the diametrally opposed switches 78 and 79 by the now-rotating housing 71, is sufficient to cause the mercury to flow radially outwardly from the axis of rotation of the housing 71, thereby effecting closing of both switches. Assuming one of the switches 11 or 11' is closed also at this time, this completes the circuit from the battery 82, through the now-closed switches 78 and 79, the now-closed switch 11 or 11', whichever one is associated with a leaking or flat tire, the transmitter T, and back to the battery 82. The transmitter is thus energized so that it emits through the contact 87 and antenna 86 a radio signal, which can be picked up by a conventional radio receiver (not illustrated) mounted in the cab of the vehicle, thereby either audibly or visually, or in both ways, to warn the driver of the condition of his tire before he can have driven very far on it. The use in the circuit of a radio transmitter T and of radio antenna 86 obviates the difficult wiring that might otherwise be necessary for transmitting the signal between the hub caps and the cab of the truck or other vehicle.

Switch 90 is provided to permit a driver to check the status of his tires before starting the vehicle. When closed, the switch 90, which may be mounted to be accessible from the exterior of the housing 71, shunts the mercury switches 78 and 79, so that the transmitter T will be energized by the battery 82 provided one of the switches 11 or 11' is closed. When a warning signal is transmitted by transmitter T, the driver may then investigate the two tires associated with the two switches 11 and 11' to determine which of the tires is flat or below the desired pressure.

Since the switches 78 and 79 normally prevent the transmitter T from being energized when the vehicle is at a standstill, even though the air pressure in one of a pair of tires may be unsatisfactory, the power of the battery 82 is thus conserved. Applicant's novel warning device eliminates the possibility of the battery 82 being uselessly run down during the absence of the driver, and also obviates the possibility of the driver driving off with a dangerously low tire. With the exception of the manually operable switch 90, the transmitter T cannot be energized unless the associated vehicle is moving at approximately five miles per hour, at which time, of course, the driver will be present to hear or see the warning signal, depending upon the type of receiver employed on the cab of the truck.

The air pressure necessary to open a switch 11 may be adjusted by rotating setscrew 22. This adjustment either increases or decreases the compressive force in the spring 20 which must be overcome by the air pressure in the associated tire in order to open the switch. Before the switch 11 is used, and after its screw 22 has been adjusted, it is desirable to fill the voids in the grooves 36 and 37 and the opening in the right end of the housing with a liquid sealant, or the like, to prevent corrosive matter or dirt from entering the housing.

Having thus described my invention, what I claim is:
1. A device for indicating a low pressure condition in a pneumatic tire, comprising:
 (a) an electrical circuit,
 (b) first switch means in said circuit responsive to the pressure in the tire to close when said pressure falls below a predetermined value,
 (c) second switch means in said circuit responsive to the rotation of the tire to close when the tire is rotating, and to open when the tire is not rotating, and
 (d) electrical signalling means in said circuit operable to emit a warning signal only when both said first and second switch means are closed.

2. A device as defined in claim 1, including third, normally open switch means in said circuit movable manually to a closed position to operate said signalling means independently of said second switch means, when said first switch means is closed.

3. A device as defined in claim 1, wherein:
(a) said first switch means comprises a normally-closed, pressure-responsive switch connected to the valve stem of said tire to be held open by said pressure, when the latter is above said predetermined value,
(b) said second switch means comprises at least one further switch rotatable with said tire and connected in series with said pressure-responsive switch, and
(c) said further switch has movable contact means operative in response to centrifugal forces generated upon the rotation of said tire to hold said further switch closed, when said tire is rotated above a predetermined speed.

4. A device as defined in claim 1, wherein said second switch means comprises:
(a) a pair of switches connected in series with said first switch means and said signalling means,
(b) means supporting said pair of switches in spaced relation to one another and for rotation with said tire about its axis of rotation, and
(c) movable contact means in each of said pair of switches operative to close said pair of switches upon rotation of said tire, and to open at least one of said pair, when said tire is not rotating.

5. A device as defined in claim 4, wherein said pair of switches comprises two mercury switches mounted, respectively, at diametrally opposite sides of the axis of rotation of said tire.

6. A device as defined in claim 4, including a manually operable, normally open switch connected in parallel with said pair of switches, and in series with said first switch means and said signalling means, and operative upon being closed to energize said signalling means, when said first switch means is closed.

7. A device as defined in claim 4, wherein said supporting means comprises:
(a) a housing surrounding said pair of switches,
(b) means for mounting said housing on the axle of the vehicle supported by said tire, thereby to be rotated with said tire, and
(c) means for securing said pair of switches in said housing at diametrally opposite sides of the axis of rotation of said housing.

8. A device as defined in claim 4, wherein:
(a) said housing has a removable cover in one end thereof,
(b) an antenna is mounted in said cover, and
(c) said signalling means includes a transmitter, which is disposed in said housing to be connected to said antenna, when said cover is mounted in said one end of said housing.

9. A device as defined in claim 1, wherein said first switch means comprises:
(a) a first, axially bored member,
(b) a flexible diaphragm secured over one end of said member,
(c) a movable contact mounted for limited reciprocation in the bore of said first member,
(d) a spring in said bore resiliently urging said contact against one side of said diaphragm, and into engagement with a pair of stationary contacts in said bore, and
(e) a second member rotatably mounted on said one end of said first member, and threadable onto the valve stem of said tire to place the opposite side of said diaphragm in communication with the interior of said tire,
(f) said diaphragm being operative to shift said movable contact against the resistance of said spring, and out of engagement with said stationary contacts, when the pressure in said tire exceeds said predetermined value.

10. A device as defined in claim 9, including means adjustable at the opposite end of said first member to adjust the tension in said spring.

11. A device as defined in claim 1, wherein said second switch means comprises a pair of mercury switches mounted, respectively, at diametrally opposite sides of the axis of rotation of the tire so that one at least is open when the tire is standing still but both are closed by centrifugal force when the tire is rotating at a predetermined speed.

12. A device as claimed in claim 1, wherein said first switch means is mounted on the valve stem of the tire, said second switch means is mounted on the hub cap of the wheel which carries the tire, and said electrical signalling means includes a radio antenna mounted on said hub cap for transmitting the signal by radio.

References Cited

UNITED STATES PATENTS 3,297,984   1/1967   Necker _____ 340—58

JOHN W. CALDWELL, *Primary Examiner.*

A. H. WARING, *Assistant Examiner.*

U.S. Cl. X.R.

200—61.25, 80; 116—34